(12) United States Patent
Shipman, Jr. et al.

(10) Patent No.: US 8,498,937 B1
(45) Date of Patent: Jul. 30, 2013

(54) MANAGING FINANCIAL ACCOUNTS ASSOCIATED WITH RESIDENTS OF CONTROLLED-ENVIRONMENT FACILITIES

(75) Inventors: Bobby L. Shipman, Jr., Jonesboro, AR (US); Mark A. Haney, Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 165 days.

(21) Appl. No.: 13/294,649

(22) Filed: Nov. 11, 2011

(51) Int. Cl.
*G06Q 40/00* (2012.01)
(52) U.S. Cl.
USPC .................. 705/41; 705/35; 705/39
(58) Field of Classification Search
USPC ....................................... 705/35, 39
See application file for complete search history.

(56) References Cited

U.S. PATENT DOCUMENTS

| | | | | |
|---|---|---|---|---|
| 2007/0013527 A1* | 1/2007 | Sloan | ........................ | 340/573.4 |
| 2008/0040781 A1* | 2/2008 | Keiser et al. | ...................... | 726/5 |
| 2009/0076832 A1* | 3/2009 | Collins | ............................. | 705/1 |
| 2011/0047473 A1* | 2/2011 | Hanna et al. | ................... | 715/740 |
| 2012/0059760 A1* | 3/2012 | Rosenfield et al. | ............. | 705/39 |
| 2013/0018767 A1* | 1/2013 | Williams et al. | ................ | 705/35 |

* cited by examiner

*Primary Examiner* — William Rankins
(74) *Attorney, Agent, or Firm* — Fogarty, L.L.C.

(57) ABSTRACT

Systems and methods for managing financial accounts associated with residents of controlled-environment facilities are disclosed. In some embodiments, a method may include receiving information corresponding to a pooled account (e.g., a trust account, etc.) held by a financial institution (e.g., a bank), at least in part, for the benefit of residents (e.g., work-release inmates, etc.) of a controlled-environment facility (e.g., a jail, prison, etc.). The method may also include allocating funds within the pooled account to corresponding residents. The method may further include designating a first portion of the funds allocated to a given resident as inaccessible to the resident and designating a second portion of funds allocated to the given resident as accessible to the resident. A magnetic card, near-field communications (NFC) device, or the like may be associated with the accessible portion of a resident's funds and used to complete transactions inside and/or outside of the controlled-environment facility.

20 Claims, 5 Drawing Sheets

MANAGING FINANCIAL ACCOUNTS ASSOCIATED WITH RESIDENTS OF CONTROLLED-ENVIRONMENT FACILITIES

TECHNICAL FIELD

This specification relates to systems and methods for managing financial accounts associated with residents of controlled-environment facilities.

BACKGROUND

In the United States, when a person is arrested, detained, or otherwise committed to a correctional facility, that person is typically stripped of his or her personal possessions (e.g., cash, watches, jewelry, clothes, personal electronics, etc.) during an intake process commonly referred to as "booking." Cash is deposited into a trust account for the individual while credit cards and other valuables are stored as personal property and returned to the individual upon his or her release from the facility. Family members or friends may be allowed to deposit additional money into the inmate's trust account during his or her incarceration.

While residing within the correctional facility, the inmate may often desire or need to initiate transactions that require monetary payment. For example, commissary purchases, medical payments, telephone calls, and other goods and services may be available to inmates whose trust accounts have sufficient funds to complete transactions. Moreover, as the inventors hereof have recognized, in prison systems that implement work-release programs and allow certain inmates to periodically leave confinement to work outside of the prison, inmates may also have a desire or need to initiate other transactions outside of the correctional facility.

Work-release inmates receive compensation from their employers. In some cases, employers mail checks to the prison administration, which will then cash the checks at a local bank (e.g., once a week) and disburse the money to respective inmates. As the inventors hereof have also recognized, however, attempting to distribute cash to inmates can cause a number of problems. Typically, a significant part of the cash can be lost, stolen, or distributed to the wrong inmate. Once the inmate receives cash, there is no mechanism in place to control, restrict, or monitor how the inmate spends his or her money (e.g., illegal or prescription drugs, etc.), especially with respect to transactions conducted outside of the correctional facility. To address these and other issues, the inventors hereof have developed various systems and methods for managing financial accounts associated with residents of controlled-environment facilities.

SUMMARY

This specification relates to systems and methods for managing financial accounts associated with residents of controlled-environment facilities. In some embodiments, certain techniques described herein may enable and/or facilitate the management of funds within pooled, escrow, or trust accounts maintained for the benefit of several (or all) residents within one or more controlled-environment facilities. In various implementations, residents may be full- or part-time residents (e.g., work-release inmates, etc.) of a controlled-environment facility (e.g., a prison, jail, etc.). Meanwhile financial accounts may be held by one or more financial institutions (e.g., banks, etc.) that are distinct or independent from the controlled-environment facilities.

In some embodiments, funds may be allocated to each resident of a given facility, and each resident's allocation may be further designated as (or split into) two or more different categories. For example, a first category of funds may be inaccessible to the resident, whereas a second category of funds may be usable by the resident, for example, to purchase goods and services inside and/or outside of the resident's controlled-environment facility. Each resident may be issued a magnetic card, near-field communication (NFC) device, or the like, and each card or device may be associated an inmates available funds (e.g., the resident's individual funds designated in the second category). As additional amounts are deposited into or debited from the pooled account, each resident's allocation and fund designations may be managed according to rules designed by the relevant authorities.

In an embodiment, a method may include receiving, over a computer network, information corresponding to a pooled account held by a financial institution, at least in part, for the benefit of a plurality of residents of a controlled-environment facility. The method may also include electronically allocating funds within the pooled account to corresponding ones of the plurality of residents. In response to a user's command received via a graphical user interface (GUI), the method may include electronically designating a first portion of the funds allocated to a given resident as inaccessible to the given resident during his or her commitment to the controlled-environment facility and electronically designating a second portion of funds allocated to the given resident as accessible to the given resident while during his or her commitment to the controlled-environment facility.

In various implementations, the pooled account may be an inmate trust account, the financial institution may be a bank, the given resident may be a work-release inmate, and the controlled-environment facility may be a work-release institution.

In some cases, a method may also include electronically adding money to the funds allocated to the given resident, the added money received from the given resident or from the given resident's employer. The method may also include electronically subtracting money from the funds allocated to the given resident, the subtracted money corresponding to at least one of a restitution obligation, child support obligation, fee, or fine. Additionally, a method may include electronically enforcing, for the given resident, an allocation rule configured to establish a maximum amount of funds allowed to be designated as the second portion. The method may further include electronically enforcing, for the given resident, a spending rule configured to control at least one of: a geographical area where funds in the second portion are allowed to be spent, a type of transaction allowed to be conducted using funds in the second portion, or a type of business allowed to receive payment from funds in the second portion. In some cases, a method may include automatically transferring funds from the first portion to the second portion in response to the second portion reaching a minimum amount.

The method may also include causing the second portion of funds to be available for the given resident's use via a physical instrument. In some implementations, the physical instrument may be a magnetic card or a near-field communication (NFC) device.

In another embodiment, a method may include receiving information corresponding to a financial account maintained, at least in part, for the benefit of a plurality of work-release inmates, allocating funds from the financial account to corresponding ones the plurality of work-release inmates, and designating, for each respective of the plurality of work-release inmates, a first portion of the allocated funds as not accessible to the respective work-release inmate and a second portion of the allocated funds as accessible to the respective work-release inmate.

The method may also include causing the system to link each second portion of allocated funds to a corresponding physical instrument, each physical instrument usable to pay for goods or services purchased by a work-release inmate outside of a controlled-environment facility. In various implementations, the physical instruments may be magnetic cards or NFC devices. Each of the physical instruments may include an account number associated with a respective second portion of the allocated funds. Further, the physical instruments may be configured to prohibit cash withdrawal or advance.

In yet another embodiment, a method may include identifying funds allocated to each of a plurality of part-time residents of a controlled-environment facility and designating, for each of the plurality of part-time residents, a first portion of the allocated funds as unusable by the part-time resident for purchases outside of the controlled-environment facility and a second portion of the allocated funds as usable by the part-time resident for purchases outside of the controlled-environment facility. In response to an indication that additional money has been received at the controlled-environment facility from a given part-time resident's employer, the method may include adding the received money to the allocated funds corresponding to the given part-time resident. Additionally or alternatively, in response to an indication that a given part-time resident's restitution obligation, child support obligation, fee, or fine is due, the method may include subtracting or withholding money from the allocated funds corresponding to the given part-time resident.

In certain implementations, the method may include controlling at least one of: a maximum amount of funds allowed to be designated in the second portion, a geographical area where funds in the second portion are allowed to be spent, a type of transaction allowed to be conducted using funds designated in the second portion, or a type of business allowed to receive payment from funds designated in the second portion. Also, in response to an indication that a given part-time resident's commitment to the controlled-environment facility is being terminated, the method may include transferring money from the first portion of allocated funds corresponding to the given part-time resident to the second portion of allocated funds corresponding to the given part-time resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and a memory coupled to the at least one processor, the memory configured to store program instructions executable by the at least one processor to cause the system to execute one or more operations disclosed herein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for managing financial accounts associated with residents of controlled-environment facilities. Various types of controlled-environment facilities are present in today's society, and persons may be voluntary or involuntary residents of such facilities, whether temporarily or permanently, full-time or part-time. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. Full-time residents typically spend all their time within a given facility for the entire duration of their commitment. Conversely, part-time residents of these facilities may include persons that are allowed to spend some amount of time outside of his or her facility despite being otherwise committed to that facility (e.g., a work-release inmate, etc.).

Controlled-environment facilities, such as the ones described above, may sometimes be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests, and a number of individuals and enterprises indirectly associated therewith, including friends and family of residents, vendors, government agencies, providers of services to residents, and individuals with a connection to the facility or its residents. Information is often exchanged and transactions are often conducted by, between, among, and on behalf of the aforementioned individuals and enterprises in performing their day-to-day activities.

For convenience of explanation, various examples discussed herein are presented in the context of correctional facilities. For instance, in some of the embodiments discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

Figure 1:
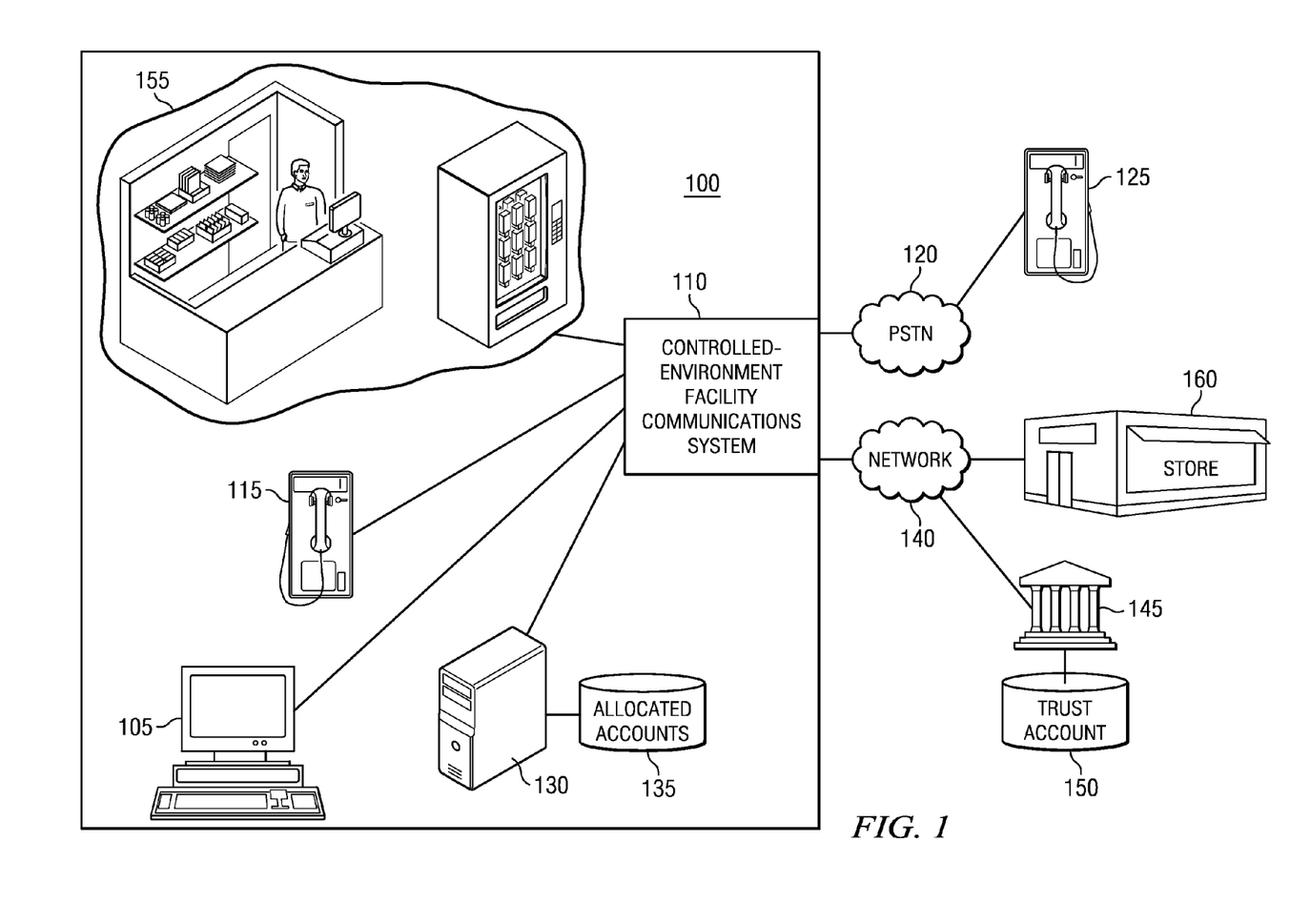
FIG. 1 is a block diagram of an illustrative environment where various systems and methods described herein may be implemented according to some embodiments.

Turning now to FIG. 1, a block diagram of an illustrative environment where various techniques described herein may be implemented is depicted according to some embodiments. As shown, prison 100 may host a plurality of inmates. In a typical scenario, immediately upon arrival at prison 100, each inmate may be subject to an "intake" or "booking" process, whereby certain information may be collected by prison staff via enrollment access terminal 105. For example, the inmate's name, gender, address, date of birth, etc. may be received by terminal 105 and stored in a prison management system (not shown). According to some embodiments, in addition to identification information, terminal 105 may also be configured to receive biometric samples (e.g., fingerprints, voice prints, iris scans, etc.) and store one or more such samples as biometric signatures that may later be used, for example, to validate the identities of inmates in the course of a transaction or purchase.

Terminal 105 may be further configured to allow prison staff to indicate how much cash the inmate has at hand at the time of booking, and this information may be provided to account management system 130 via the controlled-environment facility's communication system 110 for further processing. Once accounted for, the inmate's cash may be physically transported to local bank 145 to be deposited into a pooled, escrow, or trust account 150 held by bank 145 for the benefit of the facility's inmates. These and other operations involved in the management of the facility's trust account(s) are discussed in more detail below.

In some embodiments, prison 100 may allow an inmate to make or receive phone calls using device 115 via communication system 110. To that end, communication system 110 may include one or more analog switches, IP gateways, PBX systems, etc. that provide communication systems to prison 100. For example, an inmate within prison 100 may use device 115 to make a telephone call to (or to receive a telephone call from) a non-resident of prison 100 operating device 125 through public switched telephone network (PSTN) 120.

Although illustrated as telephones in FIG. 1, devices 115 and 125 may include any communication device such as, for example, an analog telephone, a Voice over IP (VoIP) phone, a video visitation system, an Internet terminal, etc. For example, in some embodiments, non-resident device 115 may be operable to communicate with device 125 through network 140. Network 140 may include, for example, the Internet. Additionally or alternatively, network 140 may include wireless cellular networks or the like.

In some implementations, communication system 110 may also include an interactive voice response (IVR) system. The IVR system may be configured to allow a non-resident to authorize a transfer of funds from his or her personal account (e.g., a checking account, etc.) to the facility's trust account 150 for the benefit of a specified inmate.

During their commitment to prison 100, inmates may be allowed to purchase commissary items from commissary agent 155 (e.g., a person, an automated vending machine, etc.). To conduct these types of transactions, in various implementations, commissary agent 155 may communicate with account management system 130 through communication system 110 to determine whether the inmate has sufficient funds in trust account 150 held by bank system 145. If the inmate has sufficient funds to allow a particular transaction, the inmate may be allowed to purchase the commissary item. Otherwise, commissary agent 155 may inform the inmate that there are insufficient funds and may not allow the transaction. In some situations, at least some of the inmates may be work-release inmates or other part-time residents of facility 100. Generally speaking, work-release inmates are allowed to leave facility 100 at predetermined times or days to work outside of facility 100. Accordingly, in some cases, work-release inmates may also be able to purchase certain items, for example, through point-of-sale (POS) system 160 located outside of facility 100.

In operation, account management system 130 may be configured to interface with other systems within bank system 145 to enable the implementations of various techniques described herein. As noted above, bank system 145 may maintain a trust account in database 150 for several (or all) inmates within facility 100. Meanwhile, account management system 130 may be configured to logically allocate funds from trust account 150 to individual inmates. These allocations may be stored, for example, in allocated accounts database 135. Account management system 130 may also be configured to sub-allocate funds belonging to a given inmate into two or more portions. In some cases, each such portion may be designated for a different type of use, may be subject to different restrictions or limitations, etc. For example, in some embodiments, certain portions of an inmate's individual account may be linked to a physical instrument (e.g., a magnetic card, near-fieldd communication (NFC) device, etc.), and therefore may be usable by the inmate to effect monetary transactions or purchases. Other portions of an inmate's individual account may not be so linked, and may be generally inaccessible to the inmate. The physical instrument may be provided or otherwise authorized by bank 145 and/or account management system 130.

Generally speaking, databases 135 and/or 150 may include any suitable type of application or data structure that may be configured as a data repository. For example, databases 135 and/or 150 may be configured as relational databases that include one or more tables of columns and rows and that may be searched or queried according to a query language, such as a version of Structured Query Language (SQL). Alternatively, databases 135 and/or 150 may be configured as structured data stores that include data records formatted according to a markup language, such as a version of eXtensible Markup Language (XML). In other embodiments, databases 135 and/or 150 may be implemented using arbitrarily or minimally structured data files managed and accessible through any suitable type of application.

As illustrated in FIG. 1, account management system 130 may be located inside of prison 100. In other embodiments, however, system 130 and/or components thereof may be disposed outside prison 100. For example, in some cases, account management system 130 may be at least partially co-located with bank system 145, and their respective databases 135 and 150 may be at least partially merged. Furthermore, FIG. 1 shows a single prison 100 served by a single account management system 130 for ease of explanation only. In other embodiments, two or more prisons may be served by the same account management system 130 and/or two or more of each such system may serve the same prison. Also, it should be noted that account management system 130 and/or bank system 145 may be distributed across different geographical areas.

Figure 2:
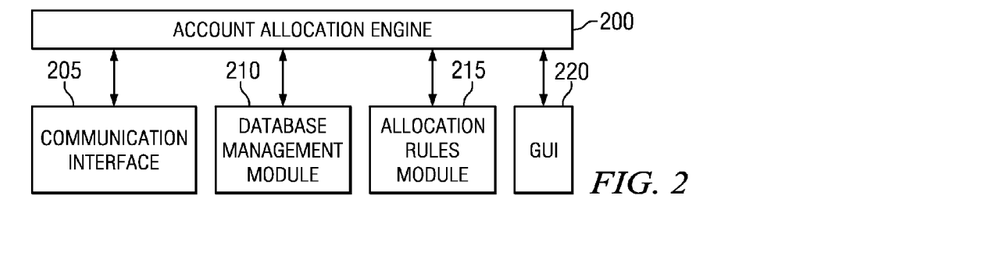
FIG. 2 is a block diagram of illustrative account management software according to some embodiments.

FIG. 2 is a block diagram of illustrative account management software according to some embodiments. In various implementations, such software may be executed by account management system 130 of FIG. 1. As shown, account allocation engine 200 is coupled to communication interface 205, database management module 210, allocation rules module 115, and graphical user interface (GUI) module 220. Moreover, account allocation engine 200 may be configured to perform operations including those described below with respect to FIGS. 3-7.

Communication interface 205 may enable the account management software to exchange information with other systems (e.g., bank system 145) via network 140. In some embodiments, communication interface 205 may be configured to transmit and/or receive information using secure socket layer (SSL) encryption. Additionally or alternatively, other connections may also be used, such as, for example, XML file transmission utilizing file transfer protocol (FTP), hypertext transfer protocol (HTTP) POST transactions, or other data transmission protocols. Communication interface 205 may further include any of a variety of standardized application programming interfaces (APIs) configured to allow different software programs to communicate (e.g., to request services and respond to such requests) in an autonomous, web-based, and/or platform-independent manner. For example, banking system 145 may choose to expose certain data (e.g., account number, balances, recent transactions, etc.) and/or certain operations (e.g., deposits, withdraws, transfers, payments, etc.) via a web services interface. Communication interface 205 may then access those exposed data and/or functions via the appropriate API(s).

Database management module 210 may include any suitable database management system (DBMS) or application configured to manage the creation, maintenance, and use of database 135 of FIG. 1. Allocation rules module 215 may include one or more sets of rules for each individual inmate (or groups of inmates), in any suitable format, that allow an administrator within facility 100 to manage the allocation and distribution of trust account funds. GUI module 220 may be configured to provide, for example, a web-based user interface (WUI) that implements JAVA™, AJAX, ADOBE® FLEX®, MICROSOFT® .NET, or similar technologies to provide real-time user control. In other cases, GUI module 220 may be a command line interface or another suitable interface using non-web based technologies.

In various embodiments, the modules shown in FIG. 2 may represent sets of software routines, logic functions, and/or data structures that are configured to perform specified operations. Although these modules are shown as distinct logical blocks, in other embodiments at least some of the functionality provided by these modules may be combined into fewer blocks. Conversely, any given one of modules 200-220 may be implemented such that its functionality is divided among two or more logical blocks. Moreover, although shown with a particular configuration, in other embodiments these various modules may be rearranged in other suitable ways.

Figure 3:
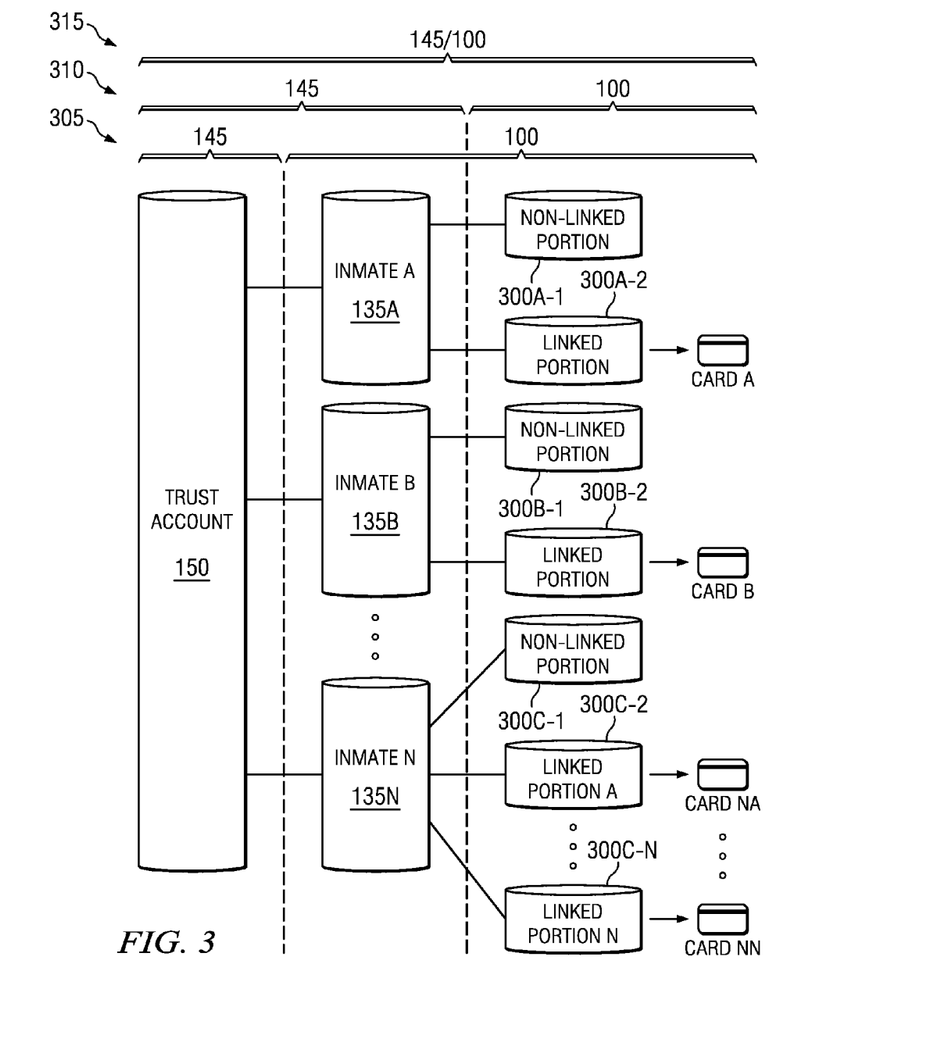
FIG. 3 is a diagram illustrating certain account management techniques according to some embodiments.

Turning now to FIG. 3, a diagram illustrating certain account management techniques is depicted according to some embodiments. These techniques may be performed, at least in part, by account management system 130 and/or banking system 145 shown in FIG. 1. Particularly, trust account 150 may include or otherwise represent a pooled or escrow account maintained for the benefit of inmates within controlled environment facility 100. Funds within trust account 150 may be allocated to individual inmates A-N in the form of individual accounts 135A-N—i.e., one account for each respective inmate. Each individual account may then be further split into different portions, each portion having its own distinct designation. For example, funds in inmate A's individual account 135A may be divided into first portion 300A-1 and second portion 300A-2. Similarly, funds in inmate B's account 135B may be split into first portion 300B-1 and second portion 300B-2. In some cases, more that two sub-portions may be used. For instance, funds in inmate N's individual account 135N may be split into N portions 300C1-N.

In various implementations, each portion may receive a designation selected by facility 100. For example, as illustrated, portions 300A-1, 300B-1, and 300C-1 are designated as being inaccessible to their respective inmates, whereas portions 300A-2, 300B-2, and 300C-2-N are designated as accessible to their respective inmates. As such, portion 300A-2 may be associated with magnetic card or NFC device A (i.e., for use by inmate A), portion 300B-2 may be associated with magnetic card or NFC device B (i.e., for use by inmate B), and portions 300C-2-N may be associated with magnetic cards or NFC devices NA-NN (i.e., for use by inmate N).

It should be noted that, whereas trust account 150 may be an actual financial account (e.g., a checking account, etc.), individual inmate accounts 135A-N may represent logical, fiscal or accounting subdivisions of trust account 150 that may be maintained by software. Also, portions 300A-1, 3-00A-2, etc. may represent further logical, fiscal or accounting subdivisions of the each respective individual inmate account 135A-N, also maintained by software. These various allocations may be created, for example, by account allocation engine 200 of the account management software depicted in FIG. 2.

Generally speaking, the account management techniques described in FIG. 3 may be implemented in various ways. For example, in implementation mode 305, banking system 145 may be responsible for managing trust account 150 and account management system 130 within facility 100 may be responsible for managing allocated accounts and designated portions of those allocated accounts. In implementation mode 310, banking system 145 may be responsible for managing trust account 150 as well as the first level of logical abstraction involved in the management of allocated accounts 135A-N, whereas account management system 130 within facility 100 may be responsible for managing only the designated portions of allocated accounts (i.e., a second level of abstraction). In implementation mode 315, either banking system 145 and/or account management system 130 may be responsible for managing trust account 150, allocated accounts 135A-N, and their designated portions.

Figure 4:
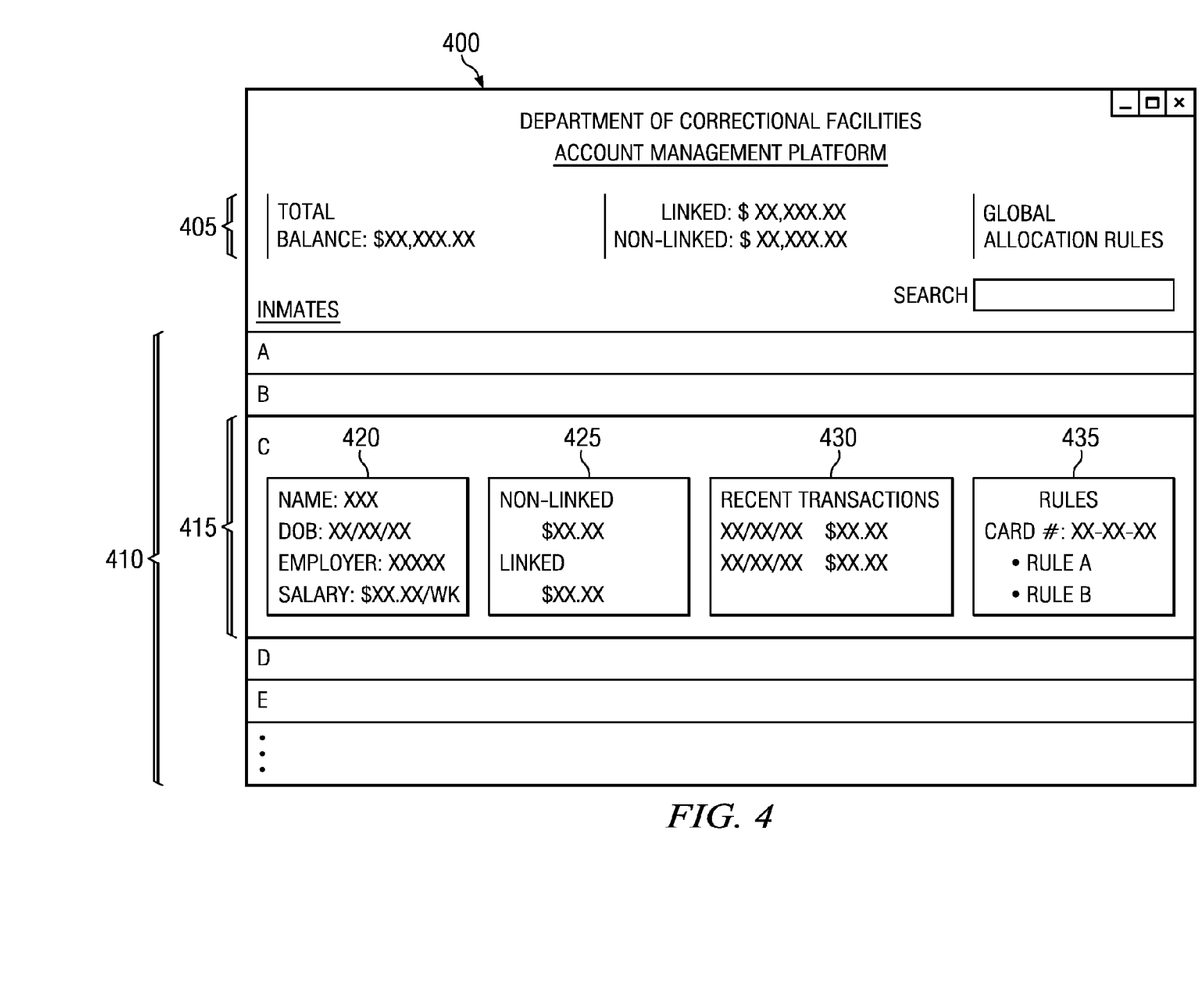
FIG. 4 is an example of a graphical user interface (GUI) according to some embodiments.

FIG. 4 is an example of a graphical user interface (GUI) according to some embodiments. In various embodiments, GUI may be displayed to a user via GUI module 220 of FIG. 2, and may be operable to display information and/or receive commands from the user. As illustrated, browser or application window 400 may be configured to display text content, image content, input features, navigable links, etc.; although in other embodiments a GUI may include more or fewer types of content in various combinations, including other common types not specifically enumerated herein. Although the various content types are discussed as segregated features, they may be interspersed or combined in any suitable fashion according to the capabilities of the browser and language used to implement the GUI, and may be displayed in any suitable area of window or application 400. In an embodiment, window 400 may be generated and managed by a web browser such as, for example, MICROSOFT EXPLORER®, FIREFOX®, SAFARI®, CHROME®, etc. executed by terminal 105 and/or account management system 130.

In the example shown in FIG. 4, first area 405 within window 400 indicates the total balance present in trust account 150, a total amount of funds that are linked to inmate cards and therefore available to them, and a total amount of funds that are not linked to inmate cards and thus inaccessible. First area 405 may also include a link to "Global Allocation Rules" (i.e., rules that affect all inmates), and other application functionality including, for example, search features, etc.

Second area 410 of window 400 includes a list of inmates within facility 100. The list may be presented or ordered, for example, by inmate's name, identification number, or the like. Each line item containing an inmate's entry may include certain summary information such as, for example, the inmate's current balance (e.g., for inmate A, the amount of funds present in individual inmate account 135A), as well as funds in the various logical account sub-portions (e.g., for inmate A, funds linked to a physical instrument in portion 300A-2 and inaccessible funds in portion 300A-1). A user may reorder the list of inmates based on these various summary items, for instance, by allowing a user to select those items using a pointing device or the like.

Once a user selects a particular inmate, third area 415 of window 400 may be displayed with detailed information about that inmate. Examples of detailed information may include, for example, biographic information (e.g., inmate's name, date of birth, employer, salary, etc.), allocated funds 425 (e.g., total allocation in individual inmate account, as well as linked and non-linked portions), recent transactions 430, and allocation rules 435 applicable to that inmate. In this manner, the GUI of FIG. 4 may allow a user to manage allocations and distribution of fund among various inmate's accounts, as well as rules applicable to those allocations and to the inmate's use of funds. As a person of ordinary skill in the art will recognize in light of this disclosure, however, the GUI shown in FIG. 4 is merely illustrative, and other variations may be implemented.

Figure 5:
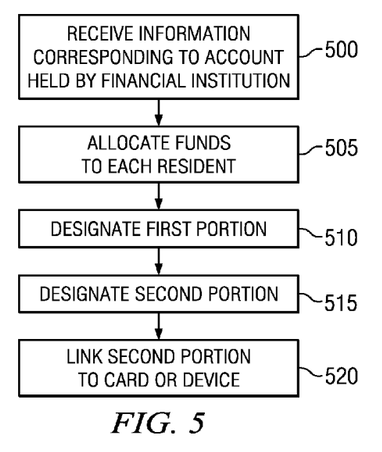
FIG. 5 is a flowchart of a method of managing financial accounts associated with residents of controlled-environment facilities according to some embodiments.

FIG. 5 is a flowchart of a method of managing financial accounts associated with residents of controlled-environment facilities according to some embodiments. In some cases, the method of FIG. 5 may be implemented at least in part by account allocation engine 200 of FIG. 2. At block 500, the method may include receiving information corresponding to an account held by a financial institution. This may include, for example, receiving from bank system 145 an account number, routing information, current balance, recent or pending transactions, etc. associated with trust account 150. At block 505, the method may include logically allocating funds to each individual resident (e.g., accounts 135A-N).

At blocks 510 and 515, the method may include designating, for each individual account, a first portion and a second portion, respectively. For example, for inmate A, blocks 510 and 515 may include logically dividing account 135A into portion 300A-1 and 300A-2. At block 520, the method may include linking, for each individual account, the second portion of the account (e.g., for inmate A, portion 300A-2) to a magnetic card, NFC device, or the like. In some cases, account allocation engine 200 may transmit a request to bank 145 to issue a magnetic check card or the like for the inmate. The check card may be linked only to the sub-portion of the respective inmate's individual account that is accessible to that inmate (e.g., 300A-2), such that the inmate may not use the card to access other funds (e.g., in portion 300A-1), despite these other funds otherwise belong to him or her. In some cases, the magnetic card may be configured such that it also does not allow the inmate to withdraw cash, for example, from an ATM machine.

In other cases, instead of issuing a magnetic card, bank 145 may cause a security code to be transmitted to an NFC-capable device, such as, for example, an inmate's smart phone or the like. Again, the code may be configured to allow the inmate to access only funds designated in a particular portion of his or her individual account.

Figure 6:
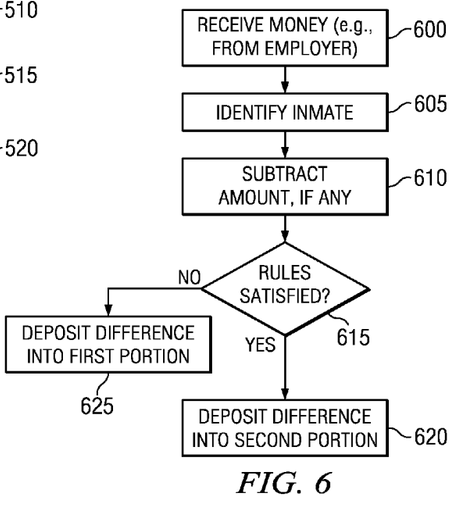
FIG. 6 is a flowchart of a method of adding money to a resident's account according to some embodiments.

FIG. 6 is a flowchart of a method of adding money to a resident's account according to some embodiments. In some cases, the method of FIG. 6 may be implemented at least in part by account allocation engine 200 of FIG. 2. At block 600, the method may include receiving money from a particular inmate, inmate's employer (e.g., a paycheck, etc.), the inmate's friends and family (e.g., electronic funds transfer (EFT), etc.). At block 605, the method may identify the inmate to whom the received funds belong, for example, by name, prison ID, etc. At block 610, the method may subtract from the received amount any existing obligation such as, for example, a restitution obligation, child support obligation, fee, or fine.

At block 615, the method may determine whether certain rules are satisfied. For example, allocation rules module 215 may include regulations such as, for instance, a maximum amount of funds that the inmate is allowed to have in the second designated portion of his or her individual account (e.g., for inmate A, portion 300A-2). In some cases, a controlled-environment facility may set a maximum and/or minimum amount of money that may be transferred to an inmate's second designated portion in a single transfer transaction and/or over a period of time. Additionally or alternatively, the controlled-environment facility may set a maximum number of transfers between the first and second designated portions over a period of time. If the rules are satisfied, the remainder of the received money may be deposited in the inmate's second designated portion and thus be linked to the inmate's magnetic card or NFC device at block 620. Otherwise, at block 625, the remainder of the received money may be deposited in the inmate's first designated portion (e.g., for inmate A, portion 300A-1), and thus be inaccessible to the inmate via his or her magnetic card or NFC device.

Figure 7:
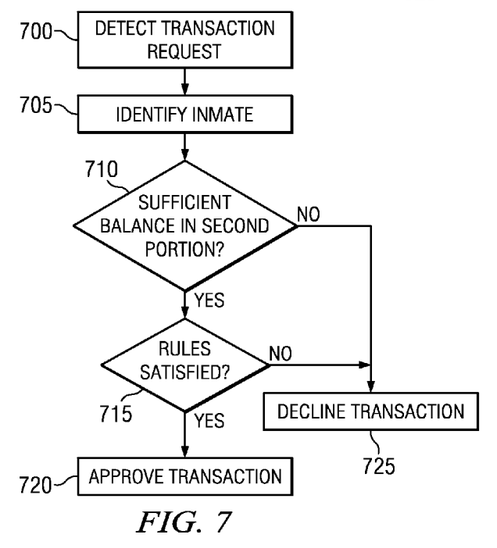
FIG. 7 is a flowchart of a method of monitoring or controlling a resident's financial transactions according to some embodiments.

FIG. 7 is a flowchart of a method of monitoring or controlling a resident's financial transactions according to some embodiments. Again, the method of FIG. 7 may be implemented at least in part by account allocation engine 200 of FIG. 2. At block 700, the method may include detecting a transaction request as indicated, for example, by commissary agent 155, POS system 160, and/or bank system 145. At block 705, the method may include identifying the inmate associated with request, for instance, by looking up the inmate's account records based on a number or code in the magnetic card or NFC device used to attempt to initiate the pending transaction.

At block 710, the method may determine whether the amount of the pending transaction exceeds the balance available to the inmate (e.g., for inmate A, the amount in second portion 300A-2). If the balance available to the inmate in the second designated portion is sufficient to conduct the transaction, control passes to block 715. At block 715, the method may determine whether the transaction is allowed for the particular inmate based on one or more transaction rules. If so, the transaction may be approved at block 720 and the appropriate amount may be deducted from the inmate's account. If at block 710 it is determined that the balance available to the inmate in his second designated account is not sufficient to complete the transaction, or if in block 715 it is determined that the rules are not satisfied, the transaction may be declined in block 725. In these cases, an alert may be transmitted to the appropriate authorities and/or sanctions may be imposed upon the offending inmate.

As noted above, the method of FIG. 7 may determine whether a pending transaction complies with transactions rules established for the requesting inmate. Examples of transaction rules include, but are not limited to, a geographical area where funds in the second portion are allowed or not allowed to be spent (e.g., based on the location of the point-of-sale where the transaction is initiated, GPS coordinates provided by the NFC device, etc.), a type of transaction allowed or not allowed to be conducted using funds in the second portion (e.g., purchases of lottery tickets, cash withdrawals, etc. may not be allowed), or a type of business that is allowed or not allowed to receive payment from funds in the second portion (e.g., stores that sell pornographic material, alcohol, etc. may not be eligible to receive payment). These various transactions rules may be stored, for example, within module 215 of FIG. 2. In some cases, certain allocation and/or transactions rules may be applicable to individual inmates. Additionally or alternatively, other such allocation and/or transactions rules may be applicable to groups of inmates (e.g., work-release inmates). Also, module 215 may allow a user (e.g., prison staff, relevant authorities, etc.) to modify allocation and/or transactions rules on a global basis (i.e., affecting all inmates) or on an individual or group basis.

As mentioned above, the method may include determining a physical, geographical area where inmates are allowed to spend money. For example, each inmate (or group of inmates) may only be allowed to spend money (e.g., by using the magnetic card linked to the second designated portion or his or her account) in a given geographical area outside of the prison. Such a geographical area may be defined, for example, by latitude and longitude, zip code(s), or in some other suitable manner. In other words, in some cases, a system implementing the method of FIG. 7 may create a "geofence" or the like. As such, if the inmate attempts to use the magnetic card or NFC device outside of the allowed area (i.e., outside the geofence), the transaction may be blocked and/or authorities may be notified of the infraction. In other embodiments, geofencing may be used to define or limit certain types of purchases to specific areas. For example, a mall or shopping center may be defined as a geographic area in which the inmate is allowed to purchase food, clothing, and electronics, but the inmate may be limited to purchasing only food outside the defined geographic area.

Additionally or alternatively, a webfencing technique may also serve to enforce limitations on an inmate's ability to spend money over the Internet. For example, in some cases, the magnetic card or NFC device may be used to conduct certain online transactions (e.g., over the Internet) in a controlled manner. For example, an inmate may be allowed to purchase calling minutes or time, commissary items, etc. via one or more websites that are pre-approved by the prison administration. In these situations, if an inmate attempts to purchase items via a non-approved retail website, a website that sells pornographic materials, etc., a system implementing the method of FIG. 7 may also block the transaction and/or notify the authorities. Although discussed in terms of an Internet transaction, similar rules may be applied in the context of phone-based transactions.

In some embodiments, the method of FIG. 7 may determine whether a resident is still incarcerated within a controlled-environment facility or still participating in a work-release or similar program prior to authorizing a given transaction. For example, if an inmate has escaped from prison (e.g., a work-release inmate has not reported back to prison at the specified time or day of the week), the otherwise accessible portion of his or her account (e.g., the second designated portion) may be frozen and/or subsequent transactions may be declined.

Figure 8:
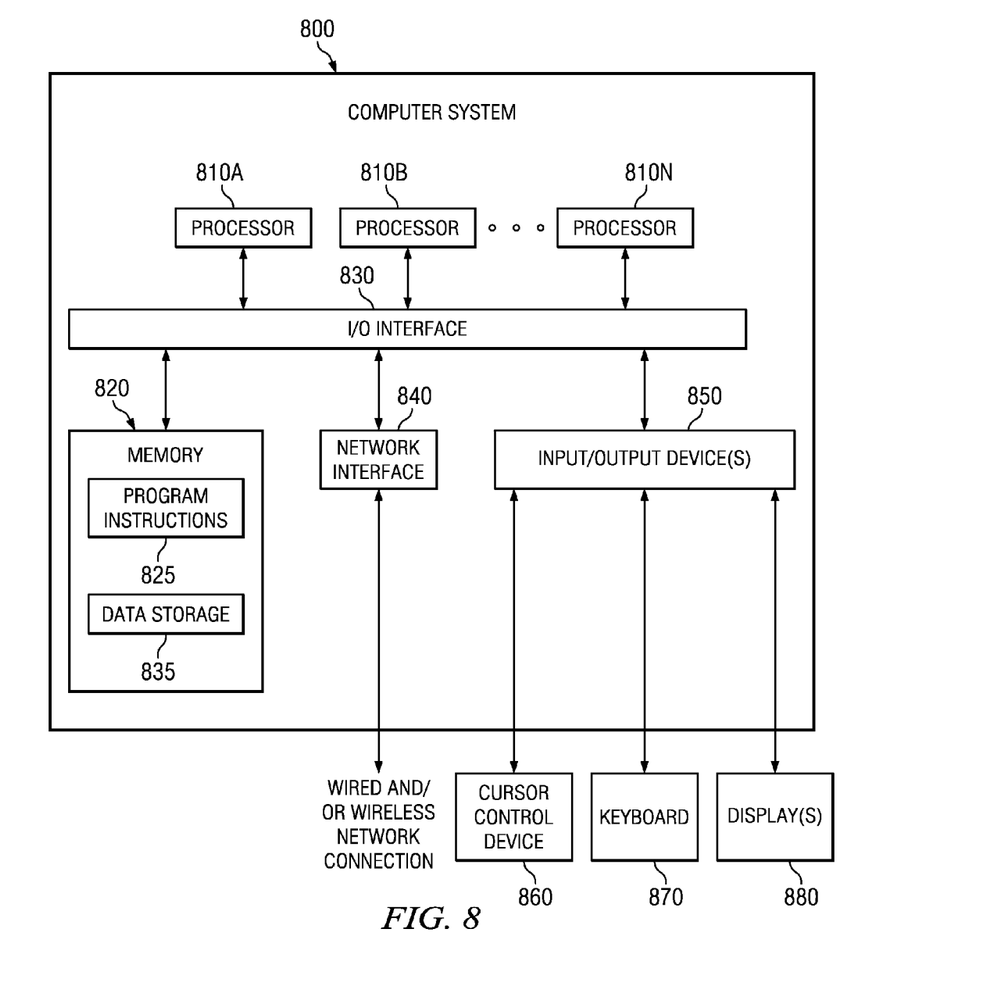
FIG. 8 is a block diagram of a computer system configured to implement certain systems and methods disclosed herein according to some embodiments.

Embodiments of systems and methods for managing financial accounts associated with residents of controlled-environment facilities, as described herein, may be implemented or executed by one or more computer systems. One such computer system is illustrated in FIG. 8. In various embodiments, computer system 800 may be a server, a mainframe computer system, a workstation, a network computer, a desktop computer, a laptop, or the like. For example, in some cases, account management system 130 shown in FIG. 1 may be implemented as computer system 800. Moreover, one or more of bank system 145, commissary systems 155, or POS system 160, may include one or more computers in the form of computer system 800. As explained above, in different embodiments these various computer systems may be configured to communicate with each other in any suitable way, such as, for example, via network 140.

As illustrated, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that a given entity (e.g., account management system 130) may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements (e.g., a first computer system may implement account allocation engine 200 while another computer system may implement allocation rules module 215).

In various embodiments, computer system 800 may be a single-processor system including one processor 810, or a multi-processor system including two or more processors 810 (e.g., two, four, eight, or another suitable number). Processors 810 may be any processor capable of executing program instructions. For example, in various embodiments, processors 810 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 810 may commonly, but not necessarily, implement the same ISA. Also, in some embodiments, at least one processor 810 may be a graphics processing unit (GPU) or other dedicated graphics-rendering device.

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1-7, may be stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-readable medium may include any tangible or non-transitory storage media or memory media such as magnetic or optical media—e.g., disk or CD/DVD-ROM coupled to computer system 800 via I/O interface 830, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 840.

In an embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any suitable protocol, timing or other data transformations to convert data signals from one component (e.g., system memory 820) into a format usable by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments, some or all of the functionality of I/O interface 830, such as an interface to system memory 820, may be incorporated into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 850 may, in some embodiments, include one or more display terminals, keyboards, keypads, touch screens, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement certain embodiments described herein, and data storage 835, comprising various data accessible by program instructions 825. In an embodiment, program instructions 825 may include software elements corresponding to one or more of the various embodiments illustrated in the above figures. For example, program instructions 825 may be implemented in various embodiments using any desired programming language, scripting language, or combination of programming languages and/or scripting languages (e.g., C, C++, C#, JAVA™, JAVASCRIPT™, Perl, etc.). Data storage 835 may include data that may be used in these embodiments. In other embodiments, other or different software elements and data may be included.

A person of ordinary skill in the art will appreciate that computer system 800 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for managing financial accounts associated with residents of controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method comprising:
performing, via one or more computer systems,
receiving, over a computer network, information corresponding to a pooled account held by a financial institution, at least in part, for the benefit of a plurality of residents of a controlled-environment facility;
electronically allocating funds within the pooled account to corresponding ones of the plurality of residents; and
in response to a user's command received via a graphical user interface (GUI),
electronically designating a first portion of the funds allocated to a given resident as inaccessible to the given resident during his or her commitment to the controlled-environment facility; and
electronically designating a second portion of funds allocated to the given resident as accessible to the given resident while during his or her commitment to the controlled-environment facility.

2. The method of claim 1, wherein the pooled account is an inmate trust account, and wherein the financial institution is a bank.

3. The method of claim 2, wherein the given resident is a work-release inmate, and wherein the controlled-environment facility is a work-release institution.

4. The method of claim 3, further comprising:
performing, via the one or more computer systems,
electronically adding money to the funds allocated to the given resident, the added money received from the given resident or from the given resident's employer.

5. The method of claim 3, further comprising:
performing, via the one or more computer systems, electronically subtracting money from the funds allocated to the given resident, the subtracted money corresponding to at least one of a restitution obligation, child support obligation, fee, or fine.

6. The method of claim 3, further comprising:
performing, via the one or more computer systems,
electronically enforcing, for the given resident, an allocation rule configured to establish a maximum amount of funds allowed to be designated as the second portion.

7. The method of claim 3, further comprising:
performing, via the one or more computer systems,
electronically enforcing, for the given resident, a spending rule configured to control at least one of: a geographical area where funds in the second portion are allowed to be spent, a type of transaction allowed to be conducted using funds in the second portion, or a type of business allowed to receive payment from funds in the second portion.

8. The method of claim 3, further comprising:
performing, via the one or more computer systems,
automatically transferring funds from the first portion to the second portion in response to the second portion reaching a minimum amount.

9. The method of claim 3, further comprising:
performing, via the one or more computer systems,
causing the second portion of funds to be available for the given resident's use via a physical instrument.

10. The method of claim 5, wherein the physical instrument is a magnetic card or a near-field communication (NFC) device.

11. A system, comprising:
at least one processor; and
a memory coupled to the at least one processor, the memory configured to store program instructions executable by the at least one processor to cause the system to:
receive information corresponding to a financial account maintained, at least in part, for the benefit of a plurality of work-release inmates;
allocate funds from the financial account to corresponding ones the plurality of work-release inmates; and
designate, for each respective of the plurality of work-release inmates, a first portion of the allocated funds as not accessible to the respective work-release inmate and a second portion of the allocated funds as accessible to the respective work-release inmate.

12. The system of claim 11, wherein the program instructions are further executable by the at least one processor to cause the system to link each second portion of allocated funds to a corresponding physical instrument, each physical instrument usable to pay for goods or services purchased by a work-release inmate outside of a controlled-environment facility.

13. The system of claim 12, wherein the physical instruments are magnetic cards or near-field communication (NFC) devices.

14. The system of claim 12, wherein each of the physical instruments includes an account number associated with a respective second portion of the allocated funds.

15. The system of claim 12, wherein the physical instruments are configured to prohibit cash withdrawal or advance.

16. A non-transitory computer-readable storage medium having program instructions stored thereon that, upon execution by one or more computer systems, cause the one or more computer systems to:
identify funds allocated to each of a plurality of part-time residents of a controlled-environment facility; and
designate, for each of the plurality of part-time residents, a first portion of the allocated funds as unusable by the part-time resident for purchases outside of the controlled-environment facility and a second portion of the allocated funds as usable by the part-time resident for purchases outside of the controlled-environment facility.

17. The non-transitory computer-readable storage medium of claim 16, wherein the program instructions, upon execution by the one or more computer systems, cause the one or more computer systems to, in response to an indication that additional money has been received at the controlled-environment facility from a given part-time resident's employer, add the received money to the allocated funds corresponding to the given part-time resident.

18. The non-transitory computer-readable storage medium of claim 16, wherein the program instructions, upon execution by the one or more computer systems, cause the one or more computer systems to, in response to an indication that a given part-time resident's restitution obligation, child support obligation, fee, or fine is due, subtract or withhold money from the allocated funds corresponding to the given part-time resident.

19. The non-transitory computer-readable storage medium of claim 16, wherein the program instructions, upon execution by the one or more computer systems, cause the one or more computer systems to control at least one of: a maximum amount of funds allowed to be designated in the second portion, a geographical area where funds in the second portion are allowed to be spent, a type of transaction allowed to be conducted using funds designated in the second portion, or a type of business allowed to receive payment from funds designated in the second portion.

20. The non-transitory computer-readable storage medium of claim 16, wherein the program instructions, upon execution by the one or more computer systems, cause the one or more computer systems to, in response to an indication that a given part-time resident's commitment to the controlled-environment facility is being terminated, transfer money from the first portion of allocated funds corresponding to the given part-time resident to the second portion of allocated funds corresponding to the given part-time resident.

* * * * *